US010607395B2

United States Patent
McCarthy

(10) Patent No.: US 10,607,395 B2
(45) Date of Patent: Mar. 31, 2020

(54) SYSTEM AND METHOD FOR RENDERING DYNAMIC THREE-DIMENSIONAL APPEARING IMAGERY ON A TWO-DIMENSIONAL USER INTERFACE

(71) Applicant: Apple Inc., Cupertino, CA (US)

(72) Inventor: Brendan A. McCarthy, San Francisco, CA (US)

(73) Assignee: Apple, Inc., Cupertino, CA (US)

( * ) Notice: Subject to any disclaimer, the term of this patent is extended or adjusted under 35 U.S.C. 154(b) by 0 days.

(21) Appl. No.: 15/243,807

(22) Filed: Aug. 22, 2016

(65) Prior Publication Data
US 2017/0046871 A1    Feb. 16, 2017

Related U.S. Application Data

(63) Continuation of application No. 14/491,191, filed on Sep. 19, 2014, now Pat. No. 9,423,873, which is a (Continued)

(51) Int. Cl.
*G06T 15/00* (2011.01)
*G06T 15/20* (2011.01)
(Continued)

(52) U.S. Cl.
CPC .............. *G06T 15/20* (2013.01); *G06F 3/012* (2013.01); *G06F 3/013* (2013.01);
(Continued)

(58) Field of Classification Search
CPC ..... G06T 15/20; G06T 19/00; G06T 2215/16; G06T 15/205; G06F 3/013; G06F 3/04815; G06F 3/012
(Continued)

(56) References Cited

U.S. PATENT DOCUMENTS 7,177,447 B2 *  2/2007  Olson .................. G06K 9/3241
                                                      348/169
7,221,366 B2     5/2007  Uyttendaele et al.
(Continued)

OTHER PUBLICATIONS

Keir et al, Dynamic Orientation Sensing for Augmented Reality Using a Dual Axis Accelerometer, Mechatronics Jun. 23-25, 2008, pp. 1-6.*
(Continued)

*Primary Examiner* — Phu K Nguyen
(74) *Attorney, Agent, or Firm* — Robert C. Kowert; Robert, Hood, Munyon, Rankin & Goetzel, P.C.

(57) ABSTRACT

System and method for rendering dynamic three-dimensional appearing imagery on a two-dimensional user interface screen of a portable computing device in dependence on a user's view-point of the screen. The method includes processing, on a portable computing device, data defining a plurality of user view-points of a user interface screen of the portable computing device. The method next includes rendering a first image of a constructed scene on the user interface screen based on a first determined user's view-point of the user interface screen of the portable computing device. The method then includes rendering a different image of the constructed scene on the user interface screen based on a subsequently determined user's view-point of the user interface screen and thereby presenting the illusion of a three-dimensional image of the constructed scene on the user interface screen.

20 Claims, 3 Drawing Sheets

Related U.S. Application Data continuation of application No. 12/242,848, filed on Sep. 30, 2008, now Pat. No. 8,866,809.

(51) Int. Cl.
```
G06T 19/00      (2011.01)
G06F 3/0481     (2013.01)
G06F 3/01       (2006.01)
```
(52) U.S. Cl.
CPC ........ *G06F 3/04815* (2013.01); *G06T 15/205* (2013.01); *G06T 19/00* (2013.01); *G06T 2215/16* (2013.01)

(58) Field of Classification Search
USPC .......................................................... 345/419
See application file for complete search history.

(56) References Cited

U.S. PATENT DOCUMENTS

| | | | | |
|---|---|---|---|---|
| 8,315,443 B2* | 11/2012 | Bi | ...................... | G06K 9/00234 382/103 |
| 8,866,809 B2* | 10/2014 | McCarthy | ................ | G06T 15/20 345/419 |
| 9,423,873 B2* | 8/2016 | McCarthy | ................ | G06T 15/20 |
| 9,589,384 B1* | 3/2017 | Waggoner | ................ | G06T 13/40 |
| 2003/0012425 A1* | 1/2003 | Suzuki | ................ | G02B 27/0093 382/154 |
| 2015/0097826 A1 | 4/2015 | McCarthy | | |

OTHER PUBLICATIONS

Hennessey C, Noureddin B, Lawrence P. A single camera eye-gaze tracking system with free head motion. InProceedings of the 2006 symposium on Eye tracking research & applications Mar. 27, 2006 (pp. 87-94). ACM.*
Yang CC, Hsu YL. A review of accelerometry-based wearable motion detectors for physical activity monitoring. Sensors. 2010;10(8):7772-88.*
Bulling, A., Roggen, D. and Tröster, G., 2009. Wearable EOG goggles: eye-based interaction in everyday environments (pp. 3259-3264). ACM.*
Al-Rahayfeh A, Faezipour M. Eye tracking and head movement detection: A state-of-art survey. IEEE journal of translational engineering in health and medicine. 2013;1:2100212-.*
Satoh K, Uchiyama S, Yamamoto H. A head tracking method using bird's-eye view camera and gyroscope. InThird IEEE and ACM International Symposium on Mixed and Augmented Reality Nov. 5, 2004 (pp. 202-211). IEEE.*
Rekimoto J. A vision-based head tracker for fish tank virtual reality-VR without head gear. InProceedings Virtual Reality Annual International Synnposiunn'95 Mar. 11, 1995 (pp. 94-100). IEEE.*
Kato, Hirokazu, and Mark Billinghurst. "Marker tracking and hmd calibration for a video-based augmented reality conferencing system." In Proceedings 2nd IEEE and ACM International Workshop on Augmented Reality (IWAR'99), pp. 85-94. IEEE, 1999.*
Avizzano et al, Head Tracking based on Accelerometer, pp. 1-6, 2004.*
Huang, H., Zhou, Y.S., Zhang, F. and Liu, F.C., Nov. 2007, An optimized eye locating and tracking system for driver fatigue monitoring. In 2007 International Conference on Wavelet Analysis and Pattern Recognition (vol. 3, pp. 1144-1149). IEEE.*
Iwata M, Ebisawa Y. PupilMouse supported by head pose detection. In2008 IEEE Conference on Virtual Environments, Human-Computer Interfaces and Measurement Systems Jul. 14, 2008 (pp. 178-183). IEEE.*
Ballard et al., "Computer Operation via Face Orientation," Pattern Recognition and Image Processing Laboratory, Computer Science Department, Michigan State University, East Lansing, MI, Apr. 11, 1992, 4 pages.
Bradski, "Computer Vision Face Tracking for Use in a Perceptual User Interface," Microcomputer Research Lab, Intel Corporation, Santa Clara, California, Apr. 21, 1998, 15 pages.
Glenstrup et al., "2 Present-Day Eye_Gaze Tracking Techniques," http://www.diku.dk/~panic/eyegaze/node8.html, downloaded on Jun. 27, 2008, 3 pages.
Hansen et al., "Use Your Head—Exploring Face Tracking for Mobile Interaction," Department of Computer Science, University of Aarhus, Aarhus N. Denmark, Apr. 27, 2006, 6 pages.
Kim et al., Vision-Based Eye-Gaze Tracking for Human Computer Interface, Department of Information and Communications, Institute of Science and Technology, Kwangju, Korea, Sep. 16, 1999, 6 pages.
Kumar et al., "Gaze-Enhanced User Interface Design," Stanford University, HCI Group, Stanford, California, Apr. 11, 2007, 33 pages.
Lee, "Johnny Chung Lee > Projects > Wii," http://www.cs.cmu.edu/~johnny/projects/wii, Dec. 21, 2007, 3 pages.
Lee, "Procrastineering, giving into productive distractions" http://procrastineering.blogspot.com/, Jun. 5, 2015, 8 pages.
The Exploratorium, "Seeing/Seeing in Context," http://www.exploratorium.edu/seeing/about/seeing_attention.html, downloaded Jun. 28, 2008, 2 pages.
Wikipedia, "Eye Tracking", https://en.wikipedia.org/wiki/Eye_tracking, last modified on Nov. 9, 2015, 11 pages.
Wikipedia, "Pupil," http://en.wikipedia.org/wiki/Pupil (eye), last modified Nov. 10, 2015, 7 pages.
Wikipedia, "Iris (anatomy)," http://en.wikipedia.org/wiki/Iris_(anatomy), last modified Nov. 11, 2015, 10 pages.
Office Action, dated Oct. 26, 2011, received in U.S. Appl. No. 12/242,848, 10 pages.
Final Office Action, dated Mar. 14, 2012, received in U.S. Appl. No. 12/242,848, 10 pages.
Office Action, dated May 2, 2013, received in U.S. Appl. No. 12/242,848, 10 pages.
Final Office Action, dated Sep. 17, 2013, received in U.S. Appl. No. 12/242,848, 10 pages.
Office Action, dated Jan. 16, 2014, received in U.S. Appl. No. 12/242,848, 11 pages.
Notice of Allowance, dated Jun. 25, 2014, received in U.S. Appl. No. 12/242,848, 5 pages.
Office Action, dated Dec. 17, 2015, received in U.S. Appl. No. 14/491,191, 10 pages.
Notice of Allowance, dated Apr. 29, 2016, received in U.S. Appl. No. 14/491,191, 5 pages.

* cited by examiner

SYSTEM AND METHOD FOR RENDERING DYNAMIC THREE-DIMENSIONAL APPEARING IMAGERY ON A TWO-DIMENSIONAL USER INTERFACE

CROSS-REFERENCES TO RELATED APPLICATIONS

This application is a continuation of U.S. application Ser. No. 14/491,191, filed Sep. 19, 2014, which claims priority under 35 U.S.C. § 120 as a continuation of U.S. application Ser. No. 12/242,848, filed Sep. 30, 2008, now U.S. Pat. No. 8,866,809, which are incorporated by reference herein in their entirety.

FIELD

This disclosure relates to rendering dynamic three-dimensional imagery, and more particularly to a system and method for rendering dynamic three-dimensional appearing imagery on a two-dimensional user interface screen.

BACKGROUND OF THE INVENTION

Consumers have access to a wide variety of portable electronic devices that are generally designed for use by a single person including, for example, laptop computers, desktop computers, cell phones, and smart phones, among others. These electronic devices frequently contain an embedded camera that can point toward a user of the device. These cameras allow the capturing and recording of images or videos by the user, and sometimes of the user in particular circumstances. For example, a camera embedded in a laptop can capture the image (still or dynamic) of a user for display while engaged in video chat or conferencing. In this configuration, participants in a call or conference receive audio data coupled with video data from each participant.

Cameras are also embedded in portable electronic device so that a user can take pictures, including of him/herself. An example of this is a user taking his or her own picture using the Photo Booth program available from Apple, Inc. Further, an operator of an electronic device including an embedded camera can program the camera to take pictures at specific time intervals allowing the creation of time-lapse photography.

Portable electronic devices that are generally designed for use by a single person typically utilize two-dimensional imagery on the user interface screen. The present disclosure appreciates that the provision of three-dimensional images on the user interface screens would also provide a benefit. In order to make these three-dimensional images more engaging, it has also been appreciated that if the user were able to "look around" the image, those images would be considered more interesting. That is to say, if the user is looking at a 3D image of a sculpture on the user interface screen, for instance, and desired to look at the right side (relative to the user) of the displayed sculpture, it would be of great interest to the user for the image of that right side of the sculpture to be displayed on cue by the user. In this context, if the actual sculpture was being observed and the user wanted to view its right side, the user would move their head to the right and peer left. The present disclosure capitalizes on this natural behavior and governs the presentation of images based on the relative position and orientation of the users head and/or eyes relative to the user interface screen when three-dimensional appearing images are being displayed.

BRIEF SUMMARY OF THE INVENTION

Additional features and advantages of the disclosure will be set forth in the description which follows, and in part will be obvious from the description, or may be learned through the practice of what is taught. The features and advantages of the disclosure may be realized and obtained by means of the instruments and combinations particularly pointed out in the patented claims. These and other features will become more fully apparent from the following description and the patented claims, or may be learned by the practice of that which is described.

This disclosure describes a system and method for rendering dynamic three-dimensional appearing imagery on a two-dimensional user interface screen. Disclosed are systems, methods and computer readable media for rendering such three-dimensional appearing imagery based on a user's view-point of the screen. In a most basic sense, the present system presents images in a way that mimics what a viewer sees in the real world when viewing an object. Using the example above of viewing a sculpture, if instead of viewing the actual sculpture, the user was viewing images of the sculpture on the user interface screen, the present system and method presents images corresponding to what would be seen if the user moved his head about the actual object, but in this case he/she moves his/her head relative to the view screen. The position and orientation of the head/eyes of the viewer relative to the view screen is assessed and images are presented on the view screen in correspondence therewith.

Therefore, using the sculpture example again, if the viewer positions his/her head above and to the right relative to the view screen, even if ever so slightly, this will be detected using head or eye tracking features on the device and an image will be presented on the view screen that represents the top, right perspective view down onto the sculpture. In this manner the user can easily control the display of dynamic three-dimensional appearing images in a very natural way. By just moving your head toward or to the position relative to the view screen from which you would like to see the displayed object, a corresponding three-dimensional appearing image of the object from that perspective will be displayed. The display is considered dynamic in that the eyes/head are constantly being tracked and series of images can be rendered on the screen that make it appear to the viewer that he is naturally seeing continuously different perspectives of the viewed object just by moving the head/eyes relative the screen in what is already the most natural of ways.

Aspects of the method disclosed herein and the principles associated therewith are also applicable to the system and computer readable medium embodiments that are also described. Accordingly, a method for rendering dynamic three-dimensional appearing imagery on a two-dimensional user interface screen of a portable computing device in dependence on a user's view-point of the screen is disclosed. The method includes processing, on a portable computing device, data defining a plurality of user view-points of a user interface screen of the portable computing device. The method next includes rendering a first image of a constructed scene on the user interface screen based on a first determined user's view-point of the user interface screen of the portable computing device. The method then includes rendering a different image of the constructed scene on the user interface screen based on a subsequently determined user's view-point of the user interface screen and thereby presenting the illusion of a three-dimensional image of the constructed scene on the user interface screen.

The data defining the plurality of user view-points of the user interface screen of the portable computing device can be at least partially acquired from signals received from a camera associated with the portable computing device.

The data processing can include determining a position of a user's head relative to the user interface screen. The data processing can further include determining a position of a user's pair of eyes relative to the user interface screen. The data processing can also include determining a position and orientation relative to, and a distance from the user interface screen of a user's head. The data processing can also include determining a position and orientation relative to, and a distance from the user interface screen of a user's pair of eyes.

The camera, as described above, can be located on the portable computing device. The camera can also be positioned on the portable computing device at a fixed location relative to the user interface screen. The camera can also include infrared sensitivity for sensing infrared images.

The method for rendering dynamic three-dimensional appearing imagery, as described above, can include emitting infrared light at the portable computing device away from the user interface screen. The method can also include acquiring, from signals received from a camera associated with the portable computing device, the data defining the plurality of user view-points of the user interface screen of the portable computing device based on infrared images of a user observing the screen. The method can also include processing the data acquired from the signals received from the camera to determine user eye position relative to the user interface screen of the portable computing device.

The infrared light can emanate from an infrared light emitter located proximate the camera on the portable computing device.

Additionally, the method can include processing the data acquired from the signals received from the camera to determine user head position relative to the user interface screen of the portable computing device. The portable computing device can be a personal digital assistant.

The portable computing device can be wireless enabled and the constructed scene can be wirelessly received by the portable computing device from a remote source prior to the different images displayed on the user interface screen being rendered locally on the portable computing device.

The data defining a plurality of user view-points of the user interface screen of the portable computing device can be limited to data representative of a single user of the portable computing device.

The infrared light emitter can be an infrared light emitting diode. This emitter can be embedded in the portable electronic device.

The camera can utilize, for example, a charge coupled device (CCD) or complementary metal oxide semiconductor (CMOS) microchip to detect images. However, the method applies to any portable computing device or combination of devices that allow rendering dynamic three-dimensional appearing imagery on a two-dimensional user interface screen of a portable computing device in dependence on a user's view-point of the screen.

BRIEF DESCRIPTION OF THE DRAWINGS

In order to describe the manner in which the advantages and features of this disclosure can be obtained, a more particular description is provided below, including references to specific embodiments which are illustrated in the appended drawings. Understanding that these drawings depict only exemplary embodiments and are not therefore to be considered limiting, the subject matter will be described and explained with additional specificity and detail through the use of the accompanying drawings in which.

DETAILED DESCRIPTION OF THE INVENTION

Various example embodiments of the rendering of three-dimensional appearing imagery are described in detail below. While specific implementations are discussed, it should be understood that this is done for illustration purposes only. A person skilled in the relevant art will recognize that other components and configurations may be used without parting from the spirit and scope of the disclosure.

Non-contact optical methods for measuring eye position and motion typically involve sensing reflected infrared light. This reflected infrared light is reflected from a user's face but absorbed by a user's pupils. Therefore, the points of light absorption can be detected as eyes. Alternatively, the IR data can be inverted, and then the pupils will stand out as very bright circles. The sensing can be done by a camera or other image sensing device. Camera based eye trackers typically use the corneal reflection (also known as the first Purkinje image) and the center of the pupil as features to track over time. A more sensitive type of eye tracker, the dual-Purkinje eye tracker, uses reflections from the front of the cornea (first Purkinje image) and the back of the lens (the fourth Purkinje image) as features to track. An even more sensitive method of eye tracking is to sense image features within the eye, such as the retinal blood vessels, and follow these features as the eye rotates. However, any method for tracking head position and eye position of a person using a personal computing device is contemplated as within the scope of this disclosure. Also, other features of a user, such as nose, chin, or ears can be utilized for tracking a user's head position for rendering the appropriate three-dimensional appearing imagery. These alternate features can be tracked when it is not possible to track the user's eyes.

Accelerometer(s) or similar type motion sensors can be incorporated into handheld device versions of the system to assist the tracking of relative head position as the device is moved about in comparison to the user's head and eyes. This routine is based on the premise that the relatively small handheld device will normally be held in the hand and moved about the user instead of the user moving his or her head about the device. In this variation, after initial target acquisition, the device relies on continual input from the accelerometer(s) and then periodically uses a camera to capture infrared images to track a user's eyes and/or head for rendering three-dimensional appearing imagery. Correspondingly, the method can include reading data from the motion sensors in coordination with reading data from the camera for rendering the three-dimensional appearing imagery. Among other benefits, use of the accelerometer(s) in tandem with the camera permits less overall power consumption and manipulation of the data outputted by the accelerometer(s) is computationally less expensive and more performant than the camera alone.

Figure 1:
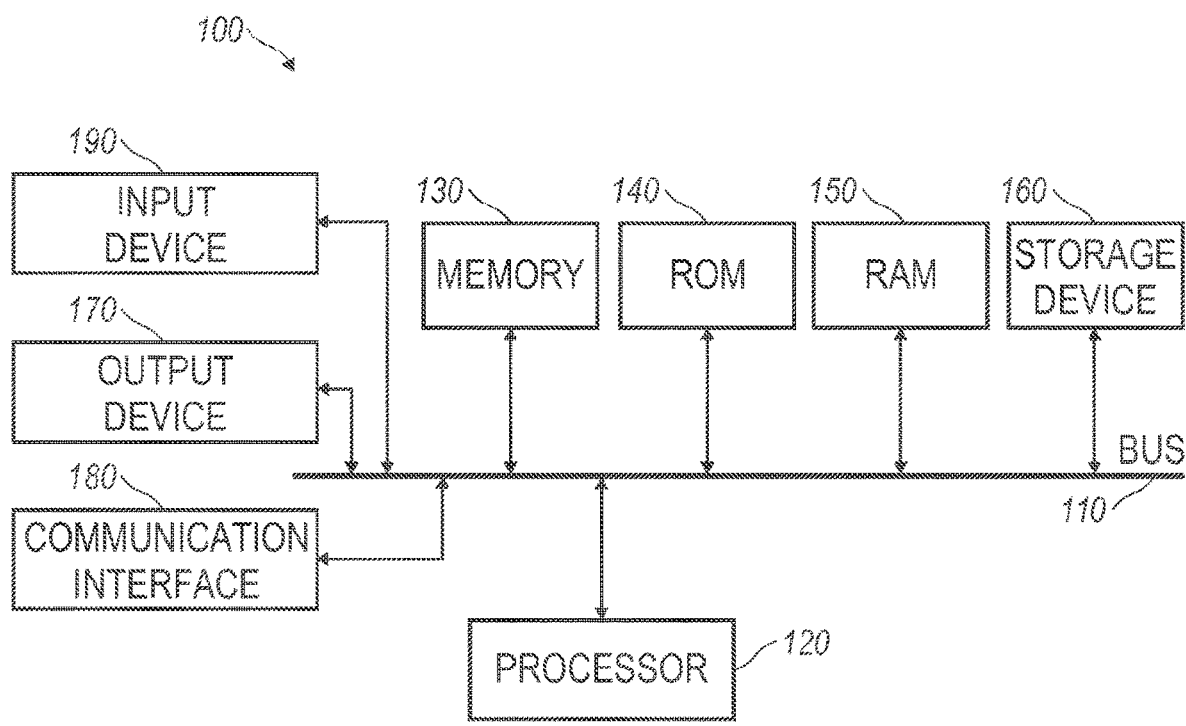
FIG. 1 illustrates an example system embodiment.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the program may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up.

The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction requiring operation on any particular hardware arrangement and therefore the basic features here may easily be substituted for improved hardware or firmware arrangements as they are developed.

For clarity of explanation, the illustrative system embodiment is presented as comprising (including, but not limited to) individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

As noted above, the present disclosure enables the rendering of three-dimensional appearing imagery on a two-dimensional user interface screen of a portable computing device. Any portable computing device capable of rendering such three-dimensional appearing imagery based on a user's view of the screen is contemplated as within the scope and spirit of this disclosure. Also, any camera, including a camera capable of sensing infrared light, is contemplated as within the scope of this disclosure.

Figure 2:
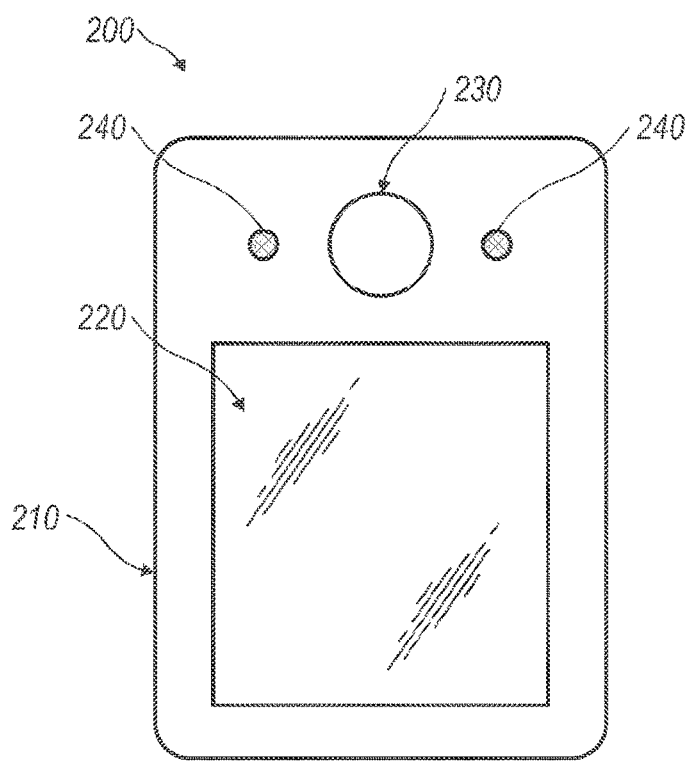
FIG. 2 illustrates an example portable computing device.

FIG. 2 illustrates an example portable computing device 200. The device, for example, can be a phone, PDA, personal entertainment device, laptop computer, or desktop computer. The device 200 also includes a body 210 and a display 220. The display 220 can be a LCD (liquid crystal display). The device 200 includes a camera 230. The camera 230 can be a CCD (charge coupled device) which is sensitive to infrared as well as visible light. Other light sensing technologies, such as CMOS (complementary metal oxide semiconductor), can be used as well. The camera 230 is positioned in a fixed position relative to the display 220. The camera 230 is positioned to face towards a user interacting with the device 200. The camera 230 can have other uses than acquiring data to determine a plurality of user viewpoints of the display 220. For example, the camera's 230 primary use can be for video conferencing.

Two infrared light emitters 240 are positioned on the device 200 as shown. Other embodiments can include one or more infrared light emitters. The infrared light emitters 240, as shown in FIG. 2, can be low-power LEDs (light emitting diodes). These infrared light emitters can be housed or sealed in the body 210 of the device 200 so that they are not noticeable during normal use.

The camera 230 and infrared light emitters 240 should be positioned so that a user will not typically block them while using the features of the invention during normal operation.

When the device 200 of FIG. 2 is active, the infrared emitters 240 produce infrared light aimed at a user. The infrared light is invisible to the naked human eye. The camera 230 captures images of a user. The device 200 determines a head position target (HPT). The device 200 determines the location of the user's eyes by analyzing reflection and absorption patterns in the infrared spectrum.

Human eyes have a well characterized size and absorption pattern. The pupils of the eyes will appear clearly as a pair of light absorbing circles which remain a fixed distance from each other. Human pupils have a generally well-defined range of size and distance. They periodically disappear and reappear as the eyes blink. This makes pupils of eyes ideal to identify and track using image recognition software.

Turning back to FIG. 2, the device shown determines the user's eyes relative position in comparison to the camera 230. In the event that the user's pupils are obscured, (for example if the user is wearing reflective glasses) an alternate signature target can be used and calculated. The device will usually be able to continue rendering the three-dimensional appearing imagery based on this alternate signature target.

From this pupil data, or alternate signature target data, a user's likely head position, orientation, and distance from the display 220 can be calculated. If the system determines that insufficient information is present to identify the relative location of the user (e.g., 2 "eyes" cannot be identified, or multiple users are using the device, or the camera or IR emitters are obscured or not operating) the device 200 can default to a mode presenting a standard 2-dimensional display. However, other modes can be programmed into the device so that other functions occur when there is insufficient information present to identify the relative location of the user's head.

Using the collected head position information, the device 200 can construct and display a three-dimensional appearing scene. Among other things (essentially anything), this scene can correspond to a graphical user interface being displayed on the device 200 to a user. The presented view of this virtual scene is determined by the user's current head position. As frames of the scene are rendered, the displayed image is adjusted in accordance to the actual user's head position relative to the screen 220 of the device 200.

The result is an illusion or virtual perspective which, to the user being tracked, makes the images rendered on the display appear dynamic and three-dimensional. This virtual perspective can be maintained as long as the stream of data regarding the user's head position is maintained and is determined to be reliable. As the user's head moves relative to the device, the invention repositions the virtual camera to maintain a continuous illusion. If, at some point, the user's head position cannot be calculated, the system will fall back into a "target acquisition" mode and attempt to relocate the user and reestablish the virtual perspective.

Figure 3:
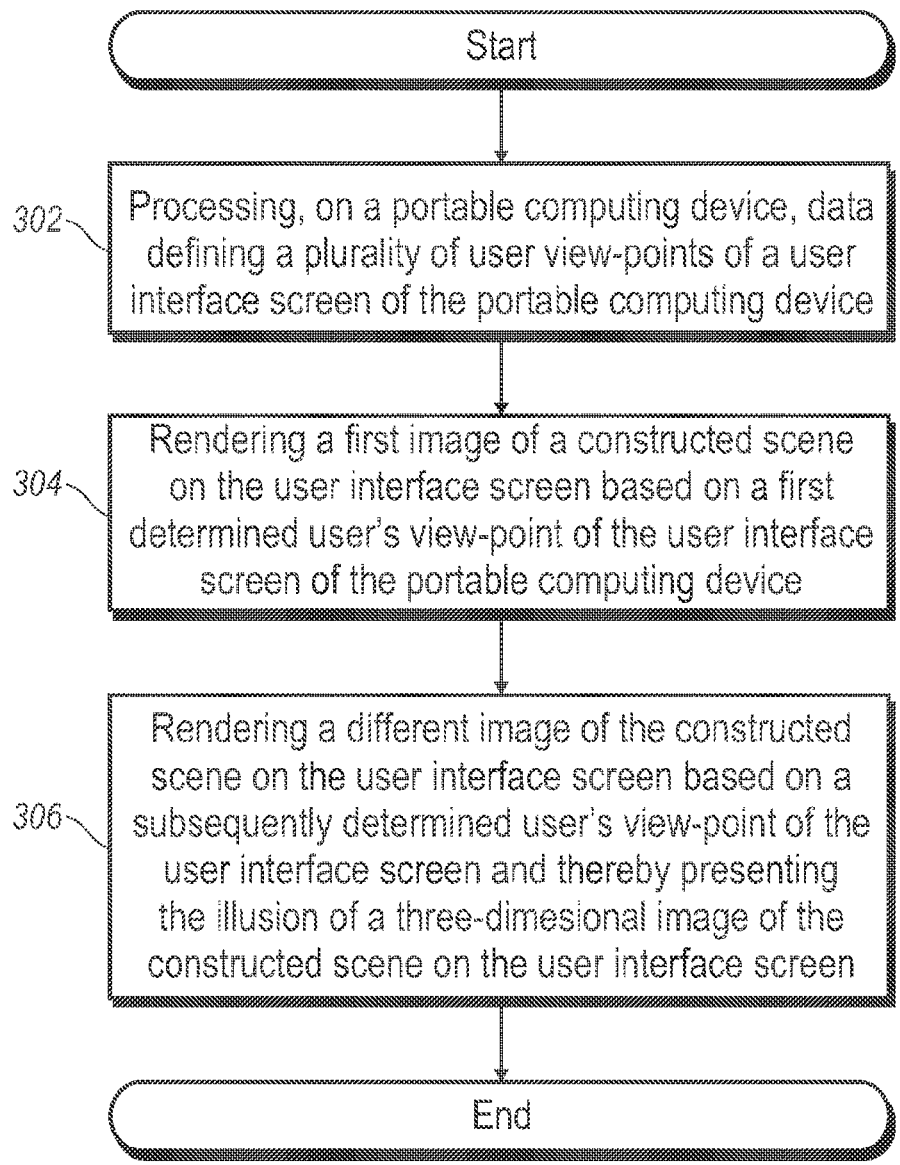
FIG. 3 illustrates an example method embodiment.

Having discussed the example portable computing device of FIG. 2, the present description turns to the exemplary method embodiment that is described. FIG. 3 charts an example of the method.

Accordingly, a method for rendering dynamic three-dimensional appearing imagery on a two-dimensional user interface screen of a portable computing device in dependence on a user's view-point of the screen is shown in FIG. 3. The method includes processing, on a portable computing device, data defining a plurality of user view-points of a user interface screen of the portable computing device 302. The method next includes rendering a first image of a constructed scene on the user interface screen based on a first determined user's view-point of the user interface screen of the portable computing device 304. The method then includes rendering a different image of the constructed scene on the user interface screen based on a subsequently determined user's view-point of the user interface screen and thereby presenting the illusion of a three-dimensional image of the constructed scene on the user interface screen 306. This process is continuously repeated thereby presenting a seemingly dynamic three dimensional image of the scene for the user, and which can be adapted by the user simply changing his or her view point of the user interface screen.

The data defining the plurality of user view-points of the user interface screen of the portable computing device can be at least partially acquired from signals received from a camera associated with the portable computing device. As mentioned above, the camera can be a charge coupled device (CCD) or complementary metal oxide semiconductor (CMOS) microchip. Other camera technologies can be used as well.

The data processing can include determining a position of a user's head relative to the user interface screen. The data processing can further include determining a position of a user's pair of eyes relative to the user interface screen. The data processing can also include determining a position and orientation relative to, and a distance from the user interface screen of a user's head. The data processing can also include determining a position and orientation relative to, and a distance from the user interface screen of a user's pair of eyes.

The camera, as described above, can be located on the portable computing device. The camera can also be positioned on the portable computing device at a fixed location relative to the user interface screen. The camera can also include infrared sensitivity for sensing infrared images.

The method for rendering dynamic three-dimensional appearing imagery, as described above, can include emitting infrared light at the portable computing device away from the user interface screen. In one embodiment infrared LEDs (light emitting diodes) are incorporated into the body of the portable computing device. The method can also include acquiring, from signals received from a camera associated with the portable computing device, the data defining the plurality of user view-points of the user interface screen of the portable computing device based on infrared images of a user observing the screen. The method can also include processing the data acquired from the signals received from the camera to determine user eye position relative to the user interface screen of the portable computing device.

The infrared light can emanate from an infrared light emitter located proximate the camera on the portable computing device.

Additionally, the method can include processing the data acquired from the signals received from the camera to determine user head position relative to the user interface screen of the portable computing device. The portable computing device can be a personal digital assistant.

The portable computing device can be wireless enabled and the constructed scene can be wirelessly received by the portable computing device from a remote source prior to the different images displayed on the user interface screen being rendered locally on the portable computing device.

The data defining a plurality of user view-points of the user interface screen of the portable computing device can be limited to data representative of a single user of the portable computing device.

The infrared light emitter can be an infrared light emitting diode. This emitter can be embedded in the portable electronic device.

Figure 4:
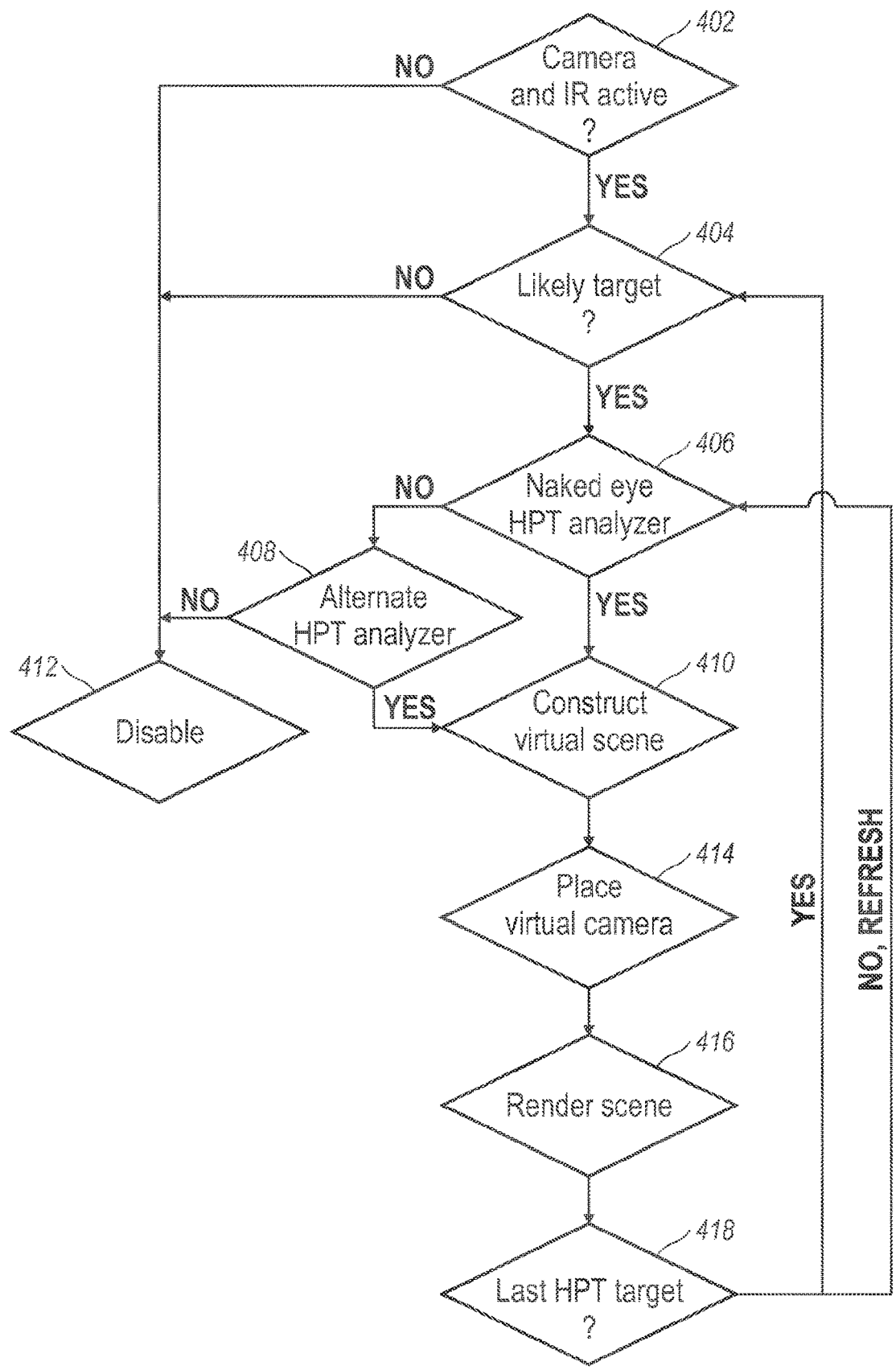
FIG. 4 illustrates another method embodiment.

FIG. 4 illustrates another method embodiment for rendering three-dimensional appearing imagery. The system determines if the camera and IR (infrared emitters) are active 402. If no, the system disables the rendering of three-dimensional appearing imagery 412 and displays two-dimensional appearing imagery.

If the camera and IR are active the system determines if there is a likely target 404. If no, the system disables the rendering of three-dimensional appearing imagery 412 and displays two-dimensional appearing imagery.

If there is a likely target, the system determines if the naked eye HPT (head position target) analyzer is able to determine the user's eyes relative position in comparison to a camera 406. If no, an alternate signature target can be used and calculated 408. This failure to determine the user's eyes relative position in comparison to a camera can occur when the user's pupils are obscured, (For example if the user is wearing reflective glasses). The system will usually be able to continue rendering the three-dimensional appearing imagery based on this alternate signature target found using alternate HPT analyzer 408.

If the naked eye HPT (head position target) analyzer is able to determine the user's eyes relative position in comparison to a camera, the system constructs a virtual scene 410. The system then places a virtual camera 414. This determines the point of view that should be displayed to a user to render the three-dimensional appearing imagery. The system then renders a scene 416. The system then determines if the HPT (head position target) has been lost 418. If the HPT has not been lost, the system refreshes and goes back for another cycle of the naked eye HPT analyzer 406.

If the HPT (head position target) has been lost, the system goes back to determining if there is a likely target 404 and proceeding to the next step once a likely target is identified.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. A "tangible" computer-readable medium expressly excludes software per se (not stored on a tangible medium) and a wireless, air interface. Thus, any such connection is properly termed a computer-readable medium. Combinations of the above should also be included within the scope of the computer-readable media.

Computer-executable instructions include, for example, instructions and data that cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. Program modules may also comprise any tangible computer-readable medium in connection with the various hardware computer components disclosed herein, when operating to perform a particular function based on the instructions of the program contained in the medium.

Those of skill in the art will appreciate that other embodiments of this disclosure may be practiced in network computing environments with many types of computer system configurations, including personal computers, hand-held devices, multi-processor systems, microprocessor-based or programmable consumer electronics, network PCs, minicomputers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments are part of the scope of this disclosure. Accordingly, the patented claims and their legal equivalents shall only define the invention(s), rather than any specific examples described herein.

What is claimed is:

1. A method, comprising:
    determining, at an electronic device, a position and an orientation of a user's head relative to the electronic device based on tracking, with a camera of the electronic device, a location of the user's eyes relative to the camera;
    displaying, on a user interface screen of the electronic device, a first image of a constructed scene based on a first determined viewpoint, wherein the first determined viewpoint is determined based on the position and the orientation of the user's head;
    detecting a change in the user's viewpoint based on accelerometer data from an accelerometer of the electronic device indicating movement of the electronic device and the accelerometer relative to the position and orientation of the user's head; and
    in response to detecting the change in the user's viewpoint, displaying, on the user interface screen, a second image of the constructed scene on the user interface screen based on a subsequently determined viewpoint.

2. The method of claim 1, further comprising:
    emitting, from at least one infrared light emitter of the electronic device, infrared light; and
    detecting, by the camera, the infrared right as reflected from the user.

3. The method of claim 2, further comprising analyzing at least one infrared image captured by the camera.

4. The method of claim 1, further comprising capturing, with the camera, infrared images to track the user's eyes and/or head for rendering the constructed scene on the user interface screen.

5. The method of claim 1, further comprising:
    determining the location of the user's eyes relative to the user interface screen using the camera; and
    in accordance with a determination that the camera is unable to determine the location of the user's eyes relative to the user interface, using and calculating an alternate signature target.

6. The method of claim 1, further comprising:
    determining whether the position of the user's head is identified; and
    in accordance with a determination that the position of the user's head is not identified:
        ceasing to display a three-dimensional image on the user interface screen, and
        rendering a two-dimensional image on the user interface screen.

7. The method of claim 1, wherein the constructed scene is wirelessly received from a remote source prior to displaying the different images on the user interface screen.

8. A non-transitory, computer-readable storage medium storing instructions, that when executed by one or more processors, cause the one or more processors to:
    determine a position and an orientation of a user's head relative to a user interface screen based on tracking, with a camera, a location of the user's eyes relative to a camera;
    display, on the user interface screen, a first image of a constructed scene based on a first determined viewpoint, wherein the first determined viewpoint is determined based on the position and the orientation of the user's head;

detect a change in the user's viewpoint based on accelerometer data from an accelerometer indicating movement of the accelerometer relative to the position and orientation of the user's head; and in response to detecting the change in the user's viewpoint, displaying, on the user interface screen, a second image of the constructed scene on the user interface screen based on a subsequently determined viewpoint.

9. The non-transitory computer-readable storage medium of claim 8, wherein the instructions further cause the one or more processors to:

capture, via the camera, infrared images to track the user's eyes and/or head for rendering the constructed scene on the user interface screen; and analyzing at least one infrared image captured by the camera.

10. The non-transitory computer-readable storage medium of claim 8, wherein the instructions further cause the one or more processors to:

determine the location of the user's eyes relative to the user interface screen using the camera; and in accordance with a determination that the camera is unable to determine the location of the user's eyes relative to the user interface, use and calculate an alternate signature target.

11. The non-transitory computer-readable storage medium of claim 8, wherein the instructions further cause the one or more processors to:

determine whether the position of the user's head is identified; and in accordance with a determination that the position of the user's head is not identified:
 cease display of a three-dimensional image on the user interface screen, and
 render a two-dimensional image on the user interface screen.

12. The non-transitory computer-readable storage medium of claim 8, wherein the instructions further cause the one or more processors to:

determine whether the position of the user's head is identified; and in accordance with a determination that the position of the user's head is not identified:
 attempt to relocate the user's head based on tracking, with the camera, a location of the user's eyes relative to the user interface screen.

13. The non-transitory computer-readable storage medium of claim 8, wherein the instructions further cause the one or more processors to:

calculate a position, an orientation, a distance, or any combination thereof, of the user's head relative to the user interface screen based on the tracked location of the user's eyes relative to the user interface screen.

14. A system, comprising:
a user interface screen;
a camera;
an accelerometer;
one or more processors;
a memory storing instructions that, when executed by the one or more processors, cause the one or more processors to perform:

determining a position and an orientation of a user's head relative to the user interface screen based on tracking, with the camera, a location of the user's eyes relative to the camera;

displaying, on the user interface screen, a first image of a constructed scene based on a first determined viewpoint, wherein the first determined viewpoint is determined based on the position and the orientation of the user's head;

detecting a change in the user's viewpoint based on accelerometer data from the accelerometer indicating movement of the accelerometer relative to the position and orientation of the user's head; and in response to detecting the change in the user's viewpoint, displaying, on the user interface screen, a second image of the constructed scene on the user interface screen based on a subsequently determined viewpoint.

15. The system of claim 14, further comprising an infrared light emitter, wherein the instructions further cause the one or more processors to perform:

emitting, from the infrared light emitter, infrared light; and detecting, by the camera, the infrared right as reflected from the user.

16. The system of claim 15, wherein the instructions further cause the one or more processors to perform:

capturing, by the camera, at least one infrared image based on the detected infrared light; and analyzing the at least one infrared image.

17. The system of claim 15, wherein the instructions further cause the one or more processors to perform:

determining whether both the camera and the infrared light emitter are active, based on a determination that both the camera and the infrared light emitter are not active:
 ceasing display of a three-dimensional image on the user interface screen, and
 rendering a two-dimensional image on the user interface screen.

18. The system of claim 14, wherein the instructions further cause the one or more processors to perform:

determining the location of the user's eyes relative to the user interface screen using the camera; and in accordance with a determination that the camera is unable to determine the location of the user's eyes relative to the user interface, using and calculating an alternate signature target.

19. The system of claim 14, wherein the instructions further cause the one or more processors to perform:

determining whether the position of the user's head is identified; and in accordance with a determination that the position of the user's head is not identified:
 ceasing display of a three-dimensional image on the user interface screen, and
 rendering a two-dimensional image on the user interface screen.

20. The system of claim 14, wherein detecting the change in the user's viewpoint is performed without using the camera to detect a change in the location of the user's eyes.

* * * * *